United States Patent
Danz et al.

(10) Patent No.: US 7,602,312 B2
(45) Date of Patent: Oct. 13, 2009

(54) PARKING AID

(75) Inventors: Christian Danz, Stuttgart (DE); Martin Noll, Muggensturm (DE); Christoph Gauger, Herrenberg (DE); Jens Schick, Herrenberg (DE)

(73) Assignee: Robert Bosch GmbH, Stuttgart (DE)

( * ) Notice: Subject to any disclaimer, the term of this patent is extended or adjusted under 35 U.S.C. 154(b) by 346 days.

(21) Appl. No.: 10/538,518

(22) PCT Filed: Sep. 16, 2003

(86) PCT No.: PCT/DE03/03073

§ 371 (c)(1),
(2), (4) Date: Dec. 15, 2005

(87) PCT Pub. No.: WO2004/053812

PCT Pub. Date: Jun. 24, 2004

(65) Prior Publication Data

US 2006/0139181 A1 Jun. 29, 2006

(30) Foreign Application Priority Data

Dec. 11, 2002 (DE) ............................ 102 57 722

(51) Int. Cl.
G08G 1/14 (2006.01)
(52) U.S. Cl. .................................................. 340/932.2

(58) Field of Classification Search .............. 340/932.2; 348/148, 149
See application file for complete search history.

(56) References Cited

U.S. PATENT DOCUMENTS

| | | | |
|---|---|---|---|
| 6,097,314 A | 8/2000 | Desens et al. | |
| 6,147,624 A * | 11/2000 | Clapper | 340/932.2 |
| 6,147,625 A | 11/2000 | Decker | |
| 6,265,968 B1 * | 7/2001 | Betzitza et al. | 340/436 |
| 6,650,250 B2 * | 11/2003 | Muraki | 340/932.2 |
| 6,694,259 B2 * | 2/2004 | Curbow et al. | 701/213 |
| 6,906,640 B2 * | 6/2005 | Gotzig et al. | 340/932.2 |
| 6,940,423 B2 * | 9/2005 | Takagi et al. | 340/932.2 |
| 6,950,035 B2 * | 9/2005 | Tanaka et al. | 340/932.2 |
| 2002/0161520 A1 * | 10/2002 | Dutta et al. | 701/213 |
| 2007/0112476 A1 * | 5/2007 | Obradovich | 701/1 |

FOREIGN PATENT DOCUMENTS

| | | |
|---|---|---|
| DE | 198 06 150 | 9/1999 |
| JP | 10217848 | 8/1998 |
| JP | 11328595 | 11/1999 |
| JP | 2001199298 | 7/2001 |

* cited by examiner

Primary Examiner—Jeffery Hofsass
(74) Attorney, Agent, or Firm—Kenyon & Kenyon LLP

(57) ABSTRACT

A parking aid for a vehicle used for detecting parking spaces as the vehicle travels past the parking spaces. Properties of the parking spaces are stored in a memory and information on the parking spaces is output in an output unit.

8 Claims, 2 Drawing Sheets

PARKING AID

FIELD OF THE INVENTION

The present invention relates to a parking aid.

BACKGROUND INFORMATION

While parking, it is the object of the vehicle driver to estimate whether the parking space is large enough for parking his vehicle and whether the vehicle may be parked safely in the parking space. To make this estimation easier, conventional parking space measuring systems are used for measuring the parking space dimensions, between two parked vehicles in particular. As the vehicle drives by, distance sensors first detect a first stationary obstacle, then the length of the parking space, and then a second stationary obstacle. Subsequently, it is displayed to the driver whether his vehicle fits into the space between the obstacles. However, the driver must decide himself on the basis of this display whether he wishes to use the particular parking space for parking. It is to be taken into consideration for this purpose that, as a function of the driving skills of the driver, parking spaces of different sizes may be desired, even for the same vehicle. A comparison between the dimensions of different parking spaces is not provided. Furthermore, a measuring device must be activated even before the parking space. If a driver has driven past a parking space which is actually suitable without activating the system, he must drive past again in order to perform the measurement.

SUMMARY

A parking aid according to an example embodiment of the present invention may have the advantage that the properties of the parking space are stored and displayed to the vehicle driver, possibly in processed form. In this way, he may form an objective picture of the parking space and, if desired, compare its properties to other parking spaces which he has driven past previously or in which he has already parked previously. He may thus reliably make his decision on whether he wishes to park in a particular parking space.

It may be particularly advantageous to display a length, a width, a relationship to the vehicle dimensions, and/or a distance of the vehicle to the parking space. On the basis of this information, the user may make his decision and possibly even drive back to a parking space which he has already passed. Finding it is made easier through the display of distance information in particular. It may be particularly advantageous to display the properties of different parking spaces simultaneously in order to allow a comparison of the different parking spaces. In this way, the user may choose the parking space suitable for him and weigh between a larger parking space and a longer walk to his actual destination, for example.

Furthermore, it may be particularly advantageous if the stored properties are deleted again after the vehicle has traveled a predefined distance to the parking space, so that only information on parking spaces which the vehicle driver may actually be expected to use must be stored.

Furthermore, it may be advantageous to activate the parking aid automatically when the vehicle speed falls below a predefined level. In this way, manual activation by the user may be dispensed with, so that even if the user intends to stop suddenly, information about previous parking spaces which have already been passed is available. The predefined vehicle speed is preferably given in this case by the maximum speed at which a reliable measurement of the parking space dimensions is still possible using the measuring units positioned on the vehicle.

Furthermore, it may be advantageous to display the properties of the parking spaces only when this is requested by a user intervention. In this way, irritation of the user through continuous display of information about possible parking spaces is avoided. Automatic activation is performed particularly advantageously when general operating elements are activated, e.g., if a turn signal is activated and/or the reverse gear is engaged. An intent to park may be concluded with high probability by performing such an operation. Further user inputs are then not necessary to activate the display.

Furthermore, it may be advantageous to integrate the output unit of the parking aid into a display unit in the motor vehicle. The display is particularly advantageously placed in a combination instrument which is used to display multiple vehicle variables. This instrument is positioned centrally so it is well visible to a user and is thus particularly noticed by the driver.

BRIEF DESCRIPTION OF THE DRAWINGS

Exemplary embodiments of the present invention are illustrated in the figures and explained in greater detail in the description below.

DESCRIPTION OF EXAMPLE EMBODIMENTS

Figure 1:
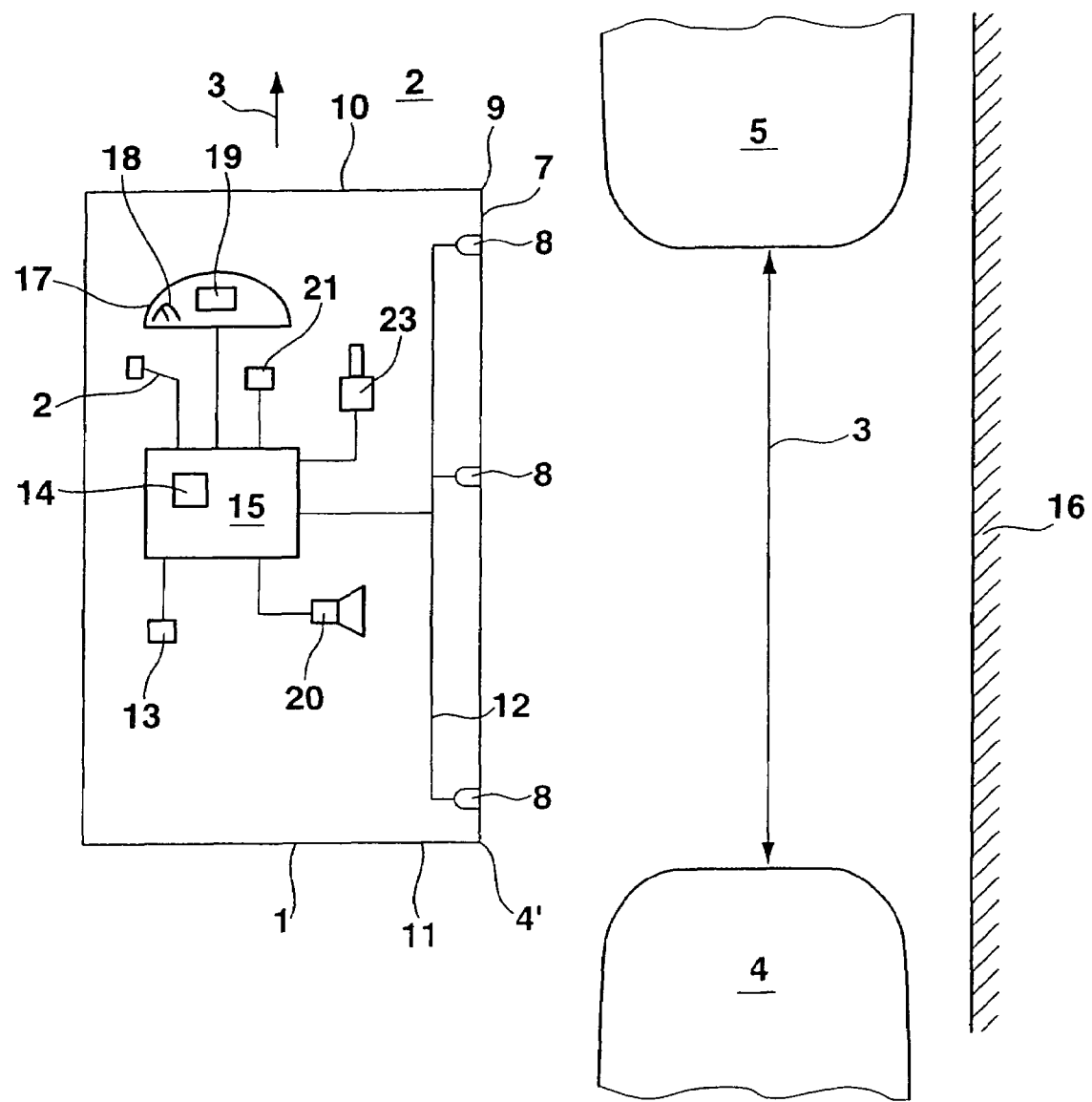
FIG. 1 shows a schematic diagram of a parking device in a vehicle which is shown in a top view driving past a parking space.

The parking aid according to the present invention may be used in any vehicles, but is used in motor vehicles in particular. FIG. 1 shows a motor vehicle 1 which travels on a road 2 in a driving direction 3 indicated by an arrow. A parking space 6, the length of which is also indicated by arrows, is located between a first vehicle 4 and a second vehicle 5. Three distance sensors 8, which are used as a measuring unit for distance measurement, are positioned on a right vehicle side 7 of motor vehicle 1. Distance sensors 8 are preferably designed as ultrasound sensors which emit an ultrasound signal, receive the reflected ultrasound signal, and determine a distance from motor vehicle 1 to obstacles next to the motor vehicle from the propagation time of the ultrasound signal. Instead of ultrasound sensors, sensors which emit other wave signals may also be used, in particular electromagnetic waves such as radar waves.

Three distance sensors 8 are provided in the specified exemplary embodiment. However, only one or two distance sensors or even more than three distance sensors may be used. In addition to or instead of distance sensors 8 shown in FIG. 1, distance sensors, which are mounted on vehicle corners 9, 9' and whose beam cones are slanted by approximately 45° toward vehicle front 10 or a vehicle rear 11 and right vehicle side 7, may also be used. For parking on the left vehicle side, additional distance sensors may be positioned there as a supplement, but they are not shown in FIG. 1 for reasons of clarity.

Distance sensors 8 are connected to an analyzing unit 15 via data lines 12. Analyzing unit 15 registers the measuring data detected by distance sensors 8 as motor vehicle 1 travels past parking space 6 and assigns this data to a particular position of motor vehicle 1 using travel distance signals. The travel distance signals are transmitted to analyzing unit 15 via a travel distance sensor 13, e.g., a wheel speed sensor. The measured distance values are stored in a memory unit 14. In a further embodiment, the length and/or the width of parking space 6 may be stored in memory unit 14 instead. In a further exemplary embodiment, the relationship of the length of parking space 6 and the length of motor vehicle 1 may also be stored in a suitable way in memory unit 14. This may be, for example, the length difference of motor vehicle 1 in relation to the length of parking space 6, but may also merely be information on whether the parking space is well suitable, poorly suitable, or not suitable at all for parking. In addition to the distance of motor vehicle 1 to first vehicle 4 and second vehicle 5, the distance to a lateral boundary of parking space 6, in this case to a house wall 16, is also measured by distance sensors 8 in this case.

Analyzing unit 15 is additionally connected to a display unit 17 situated in front of the driver, which is used for multiple displays. Scale displays 18, for displaying the fuel tank fill level, the coolant temperature, and/or the vehicle speed, may be provided for example. In a preferred embodiment, a display screen, e.g., a liquid crystal display, is provided, in which a plurality of information may be shown. In a preferred embodiment, the information of the parking aid is displayed on display screen 19, so that display unit 17 is used as the output unit. Instead of the combination instrument shown here, the information of the parking aid may also be output in a further display in the center console of the motor vehicle. As a supplement to and/or instead of purely visual information, a loudspeaker 20 is provided, which outputs acoustic information regarding parking space 6. The acoustic output may be restricted to warning signal sounds, but may also output information about the parking space in voice form, e.g., "the parking space just passed is large enough for safe parking."

In a preferred embodiment, distance sensors 8 are automatically activated when the speed falls below a predefined level. This predefined speed is preferably determined by the maximum measurement resolution of distance sensors 8, since at a higher speed, reliable detection of passed parking space 6 which is still sufficiently precise is possibly no longer provided. This speed is thus a function of the sensors used, their number, and/or their activation. In one embodiment, this speed is between 20 kmh and 45 kmh. Corresponding speed information is transmitted either by travel distance sensor 13 or display unit 17, via a data bus, for example, to analyzing unit 15, which activates distance sensors 8 for the measurement as a function of this signal. If the speed falls below the predefined level, distance sensors 8 measure the roadside which motor vehicle 1 is traveling past until either a parking procedure is initiated or the limiting speed is again exceeded. The corresponding distance values and/or parking space information, assigned to the distance traveled by vehicle 1 as determined by travel distance sensor 13, are stored in memory unit 14. If memory unit 14 is full and/or if a predefined distance of, for example, 1 km to a passed parking space has been exceeded or if a predefined number of parking space information items, e.g., storage of data on five parking spaces, is exceeded, the data first input is deleted so that new data may be entered in memory unit 14. Instead of a speed-dependent activation of distance sensors 8, an operating element 21, via which the parking aid according to the present invention may be activated, may also be provided.

If a driver stops, the information about parking spaces already passed may be displayed to him. Different conditions may be used as a criterion for the display. In a first embodiment, activation of operating element 21 is necessary for this purpose. In a further embodiment, the display of information on parking spaces may be made dependent on a greatly reduced speed, e.g., to less than 5 kmh. This condition may also be linked, for example, to engagement of the reverse gear and/or operation of the turn signal. A display may also occur if the reverse gear and/or turn signal are each operated independently. The advantage of starting a parking space measurement as a function of a speed reduction, engagement of the reverse gear, and/or turn signal operation is that no activation of an additionally situated operating element is necessary. To register the turn signal operation, analyzing unit 15 is connected to a turn signal lever 22. To register a gear shift operation, analyzing unit 15 is connected to a shift lever 23.

Figure 2:
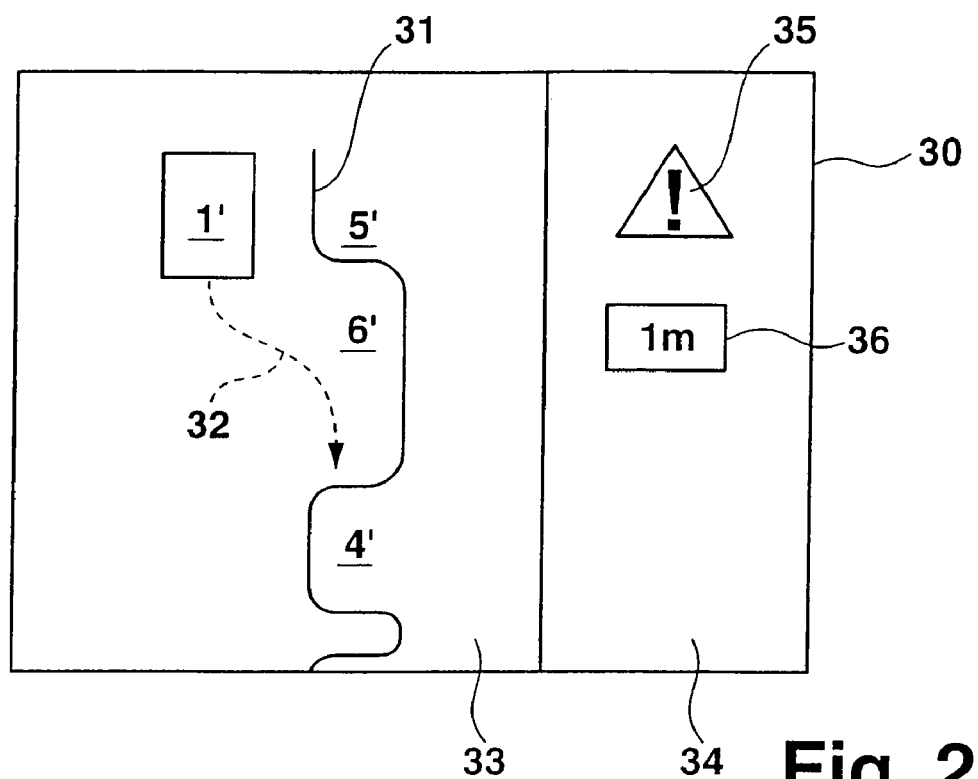
FIGS. 2 and 3 show exemplary embodiments of a display of properties of a parking space in a display unit.

A first exemplary embodiment of a display on display screen 19 is shown in FIG. 2. After the driver has stopped and set the turn signal, for example, the display of the current vehicle speed otherwise occurring in the display unit is replaced by the display of the parking aid according to the present invention shown in FIG. 2. In a display area 30 on display screen 19, a shape 31 of the geometry of the obstacles on the roadside is shown in a first region. The contour of first vehicle 4' and the contour of second vehicle 5' are recognizable. Parking space 6' is also recognizable. An illustration 1' of motor vehicle 1 is shown together with a trajectory 32 which represents the travel path of motor vehicle 1 into parking space 6'. Shape 31 of the roadside is preferably shown for a length of 5 meters to 20 meters, preferably 15 meters, in first region 33. In the exemplary embodiment shown here, a warning symbol 35 and a distance value 36, 1 m here, are additionally shown in a second region 34. The value 1 m identifies the difference between the length of parking space 6' and the length of motor vehicle 1 in this case. Warning symbol 35 is to indicate that the length difference between motor vehicle 1' and parking space 6' is only slight and the parking procedure therefore requires special caution. In addition, an acoustic voice output and/or an acoustic warning signal may be output for this purpose.

Figure 3:
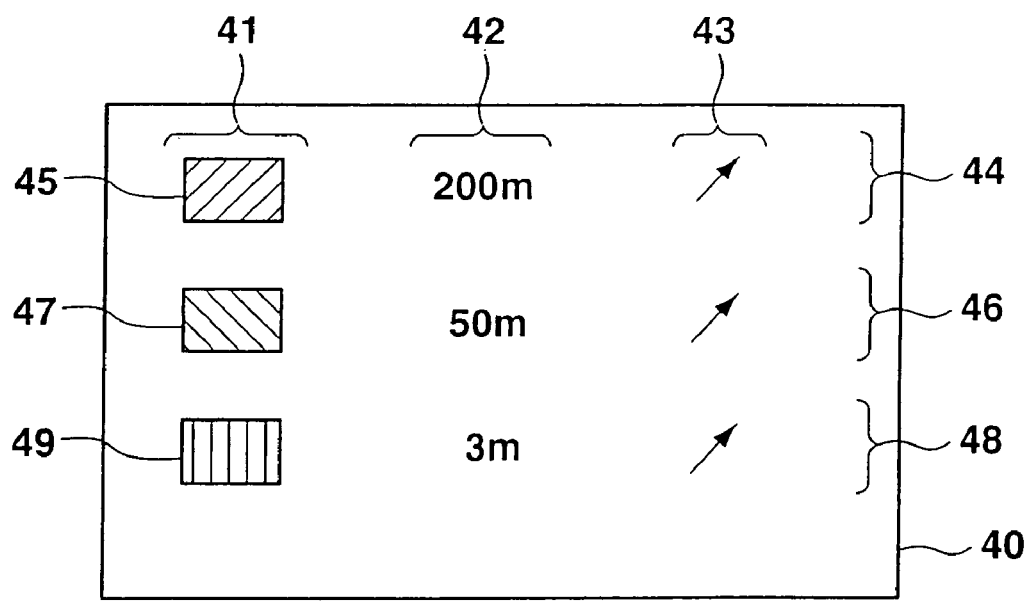

A further exemplary embodiment of a display on display screen 19 is shown in FIG. 3. A color signal for each parking space is shown in a first column 41 in display area 40. Assigned to the color signal, a distance value is displayed in a second column 42. An arrow illustration assigned to the particular parking space, for example, which indicates to the user whether it is a parking space on the right or left roadside, is displayed in a third column 43. In order to ensure clarity for a user, preferably only up to five parking spaces are displayed in display area 40. Preferably, only those parking spaces are shown which are suitable at all for parking using motor vehicle 1. In contrast, unsuitable parking spaces are preferably suppressed in the display and their data is also deleted from memory unit 14. In the exemplary embodiment shown here, the room offered by the parking space is indicated to the user via a color code in first column 41. Instead of the color code, the length of the parking space, the width of the parking space, and/or a relationship of the parking space to the external dimensions of the motor vehicle may also be displayed. In the exemplary embodiment selected here, a parking space is located at a distance of 200 m on the right side of the road according to a first display line 44, which is assigned to a red display field 45, identified by the crosshatching from bottom left to top right. This means that a parking space which only allows very tight parking is located 200 m back. In second display line 46, a parking space identified by a green display field 47 is located at a distance of 50 m, also on the right side of the road, green display field 47, identified by the crosshatching from top left to bottom right, allowing very comfortable parking. Preferably, the display of a green display field indicates that no reverse driving is necessary for parking at the parking space, but rather the vehicle may be driven comfortably into the parking space by driving forward. Third display line 48 indicates a parking space three meters back, also on the right side of the road, which is assigned a yellow display field 49, identified by the crosshatching from top to bottom. The yellow field is to indicate that parking is comfortably possible, but caution is advised. In particular, due to the parking space length, reverse parking is to be performed. A user may now decide whether to accept the parking space further away and to perform the corresponding parking procedure or to drive back the distance of 50 m in order to select the more comfortable parking space, thereby possibly having to accept a walk. If the driver continues on and if at least three further parking spaces are detected, the parking space in first display line 44 is deleted from display area 40.

What is claimed is:

1. A parking aid for a vehicle, comprising:
    a measuring unit configured to detect spatial dimensions of parking spaces as the vehicle travels past the parking spaces;
    a memory unit to store the spatial dimensions of multiple parking spaces detected by the measuring unit; and
    an output unit to output information about the parking spaces;
    wherein the spatial dimensions of multiple parking spaces are shown simultaneously in the output unit.

2. The parking aid as recited in claim 1, wherein at least one of a length, a width, a relationship to dimensions of the vehicle, and a distance of the vehicle to at least one parking space, are displayed in the output unit.

3. The parking aid as recited in claim 1, further comprising:
    an analyzing unit configured to manage the memory unit, stored spatial dimensions of parking spaces in the memory unit being deleted by the analyzing unit after a predefinable distance of the vehicle to the parking spaces.

4. The parking aid as recited in claim 1, wherein the parking aid is activated when a speed of the vehicle falls below a predefined level and is deactivated when a predefined speed is exceeded.

5. The parking aid as recited in claim 1, further comprising:
    at least one operating element situated in the vehicle, a display of the spatial dimensions of the parking space being triggered by operating at least one of the operating elements in the vehicle.

6. The parking aid as recited in claim 1, wherein the output unit is configured to display information about the parking spaces which the vehicle has traveled past.

7. A parking aid for a vehicle, comprising:
    a measuring unit configured to detect spatial dimensions of parking spaces as the vehicle travels past the parking spaces;
    a memory unit to store the spatial dimensions of multiple parking spaces detected by the measuring unit;
    an output unit to output information about the parking spaces; and
    an analyzing unit configured to manage the memory unit, stored spatial dimensions of parking spaces in the memory unit being deleted by the analyzing unit after a predefinable distance of the vehicle to the parking spaces;
    wherein:
    at least one of a length, a width, a relationship to dimensions of the vehicle, and a distance of the vehicle to at least one parking space, are displayed in the output unit,
    the spatial dimensions of multiple parking spaces are shown simultaneously in the output unit, and
    the parking aid is activated when a speed of the vehicle falls below a predefined level and is deactivated when a predefined speed is exceeded.

8. The parking aid as recited in claim 7, further comprising:
    at least one operating element situated in the vehicle, a display of the spatial dimensions of the parking space being triggered by operating at least one of the operating elements in the vehicle, wherein the output unit is configured to display information about the parking spaces which the vehicle has traveled past.

* * * * *

UNITED STATES PATENT AND TRADEMARK OFFICE
CERTIFICATE OF CORRECTION

PATENT NO. : 7,602,312 B2  Page 1 of 1
APPLICATION NO. : 10/538518
DATED : October 13, 2009
INVENTOR(S) : Danz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 723 days.

Signed and Sealed this

Fifth Day of October, 2010

David J. Kappos
*Director of the United States Patent and Trademark Office*